Dec. 23, 1924.

J. G. STONEBACK ET AL 1,520,317

UPHOLSTERY EDGE STITCHING MACHINE

Filed Feb. 14, 1921    8 Sheets-Sheet 1

Inventors
J. G. Stoneback,
and
W. A. Kelsey.
By Thorp & Gerard
Attorney

Witness:
R. E. Hamilton

Dec. 23, 1924. 1,520,317
J. G. STONEBACK ET AL
UPHOLSTERY EDGE STITCHING MACHINE
Filed Feb. 14, 1921 8 Sheets-Sheet 3

Fig. 3.

Witness:
R. E. Hamilton

Inventor
J. G. Stoneback
and
W. A. Kelsey
By Thorpe & Girard
Attorney

Dec. 23, 1924.　　　　　　　　　　　　　　　1,520,317
J. G. STONEBACK ET AL
UPHOLSTERY EDGE STITCHING MACHINE
Filed Feb. 14, 1921　　　8 Sheets-Sheet 4

Inventors
J. G. Stoneback,
and
W. A. Kelsey

Witness:
R. E. Hamilton

By Thorpe & Gerard
Attorney

Patented Dec. 23, 1924.

1,520,317

UNITED STATES PATENT OFFICE.

JOHN G. STONEBACK AND WILLARD A. KELSEY, OF TOPEKA, KANSAS; SAID KELSEY ASSIGNOR OF HIS RIGHT TO SAID STONEBACK.

UPHOLSTERY-EDGE-STITCHING MACHINE.

Application filed February 14, 1921. Serial No. 444,940.

*To all whom it may concern:*

Be it known that we, JOHN G. STONEBACK and WILLARD A. KELSEY, citizens of the United States, and residents of Topeka, county of Shawnee, State of Kansas, have invented a certain new and useful Improvement in Upholstery-Edge-Stitching Machines, of which the following is a complete specification.

This invention relates to upholstery sewing machines, and more especially to a machine for sewing roll edges on upholstery cushions and the like, and the object of the invention is to produce a machine for producing roll edges on articles of the general character mentioned in an efficient and expeditious manner and at a much lower cost than such work can be performed by hand.

With this general object in view the invention consists in certain novel and useful features of construction and combinations of parts as hereinafter described and claimed; and in order that it may be fully understood reference is to be had to the accompanying drawings, in which:—

In the said drawings, where like reference characters identify similar parts in all of the figures, 1 indicates the main frame or base of the machine and 2 a series of vertical standards secured in fixed relation to the frame at the inner side thereof, and provided at corresponding sides with vertical rack-bars 3. A table 4 overlies and is provided with vertical guide openings 5 receiving the standards 2, and extending longitudinally through and journaled in the said table is a pair of shafts 6 equipped with cog pinions 7 meshing with the rack-bars 3. Near the left hand end of the table, the shafts 6 are equipped with worm wheels 8 engaging worms 9 on a transverse shaft 10 journaled in the table, and said shaft carries a gear wheel 11 meshing with a gear pinion 12 on a short shaft journaled in the table and terminating in a squared end 13 carrying a crank handle 14, the arrangement being such that operation of the crank handle imparts upward or downward movement to the table, and the worm gearing holds it at any desired elevation.

Secured to the top of the vertically-adjustable table 4 is a series of brackets 15 constituting bearings for a series of rollers 16 to provide an anti-friction support for a table 17 adapted for travel back and forth longitudinally of table 4, and in order that the table 17 may reciprocate undeviatingly, it is provided with depending channeled tracks 18 engaging the upper portions of said rollers. Secured to and depending from a reciprocatory table 17 at the margin thereof adjacent the main frame and closely adjacent an upstanding plate 18 upon said main frame, is a rack-bar 18ᵃ meshing with a gear wheel 19 secured to the upper end of a vertical shaft 20 journaled in a pair of bearings 21 and 22 secured to the main frame. A vertical plate 23 connects the said bearings and forms a support for the intermediate portion of a U shaped bracket 24 formed with or rigidly secured in any suitable manner to the main frame. Journaled upon the vertical shaft 20 is an upper beveled gear 25 and a lower beveled gear 26 provided with clutch faces for engagement alternately by a slidable clutch 27 mounted on shaft 20 and rotatable therewith, and engaging the customary groove in the said slidable clutch member is a forked lever 28 secured upon a shaft 29 journaled in the bracket 24 and provided with a crank handle 30 at one end. A retractive spring 31 connects handle 30 with a fixed point of the main frame and tends to hold the lever with the slidable clutch member in neutral position. Movement of the lever downward effects engagement between the clutch member and beveled gear 26 while upward movement of the lever will effect engagement between the clutch member and beveled gear 25. The said beveled gears are engaged with a beveled gear 32 secured upon a horizontal shaft 33 more particularly referred to hereinafter.

Figure 1:
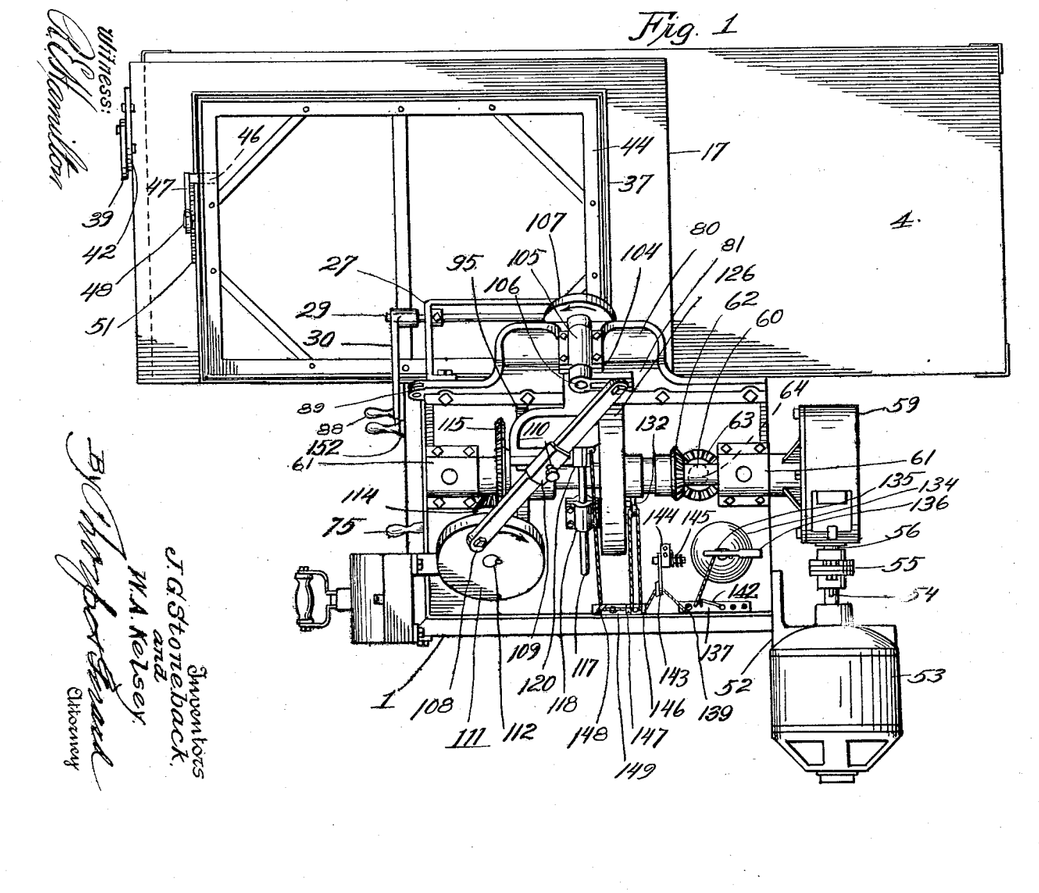
Figure 1 is a top plan view of a machine embodying the invention.
Figure 2:
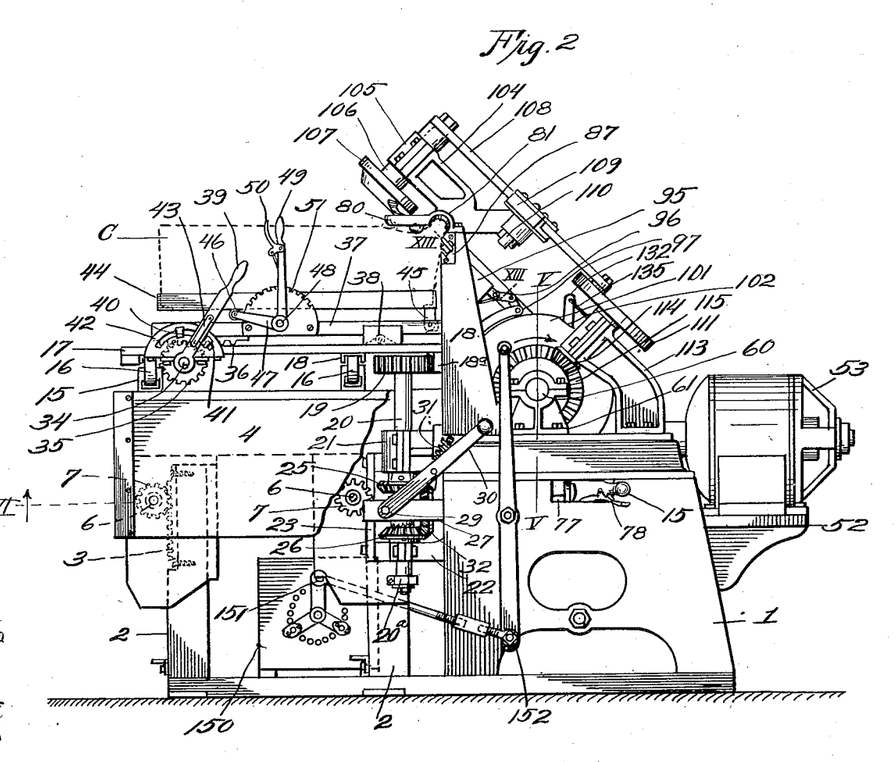
Figure 2 is an elevation of the left hand end of the machine.
Figure 3:
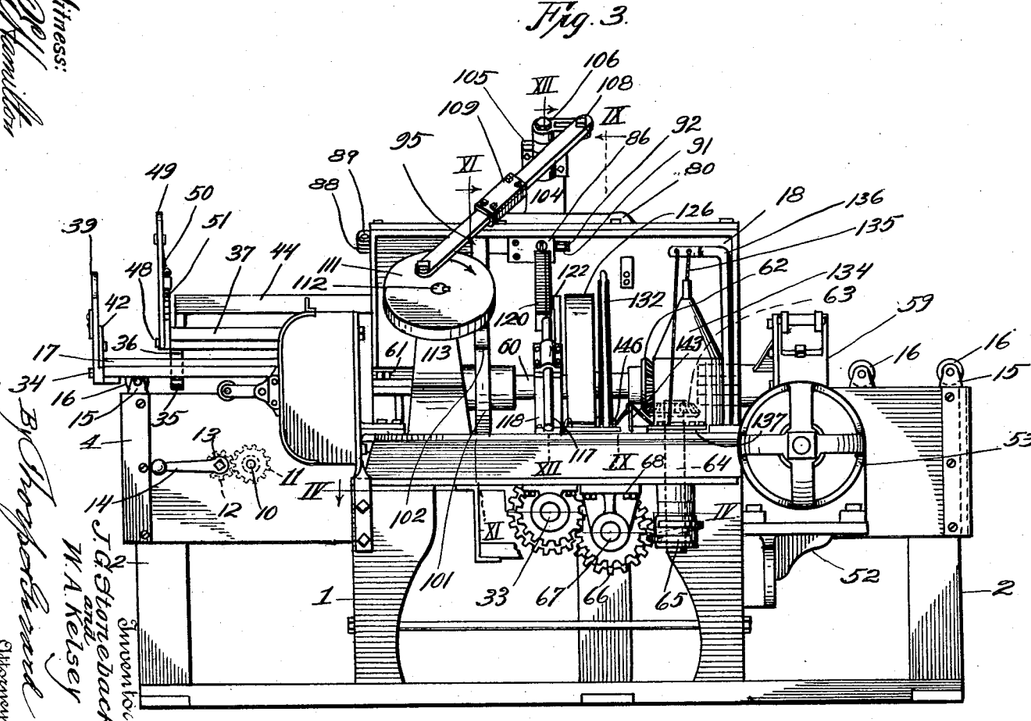
Figure 3 is an outer side elevation of the machine.

Extending longitudinally of the reciprocatory table 17 and suitably journaled thereto, is a shaft 34 equipped with a gear pinion 35 engaging a transverse rack-bar 36 secured to the under side of a transversely-adjustable table 37, said table also carrying rollers 38 resting upon table 17. At one end shaft 34 is equipped with a handle 39 limited in its throw between a pair of stops 40 and 41 secured to a sector 42 mounted on table 17, the stops being relatively adjustable to determine the range of transverse adjustment of table 37, as will be seen by reference to Figure 2. The lever 39 is also provided with a spring latch 43 for engagement with the sector 42 to guard against accidental transverse movement of said table.

A mattress or cushion container 44 is pivoted at its margin adjacent plate 18 to the table 37 as shown at 45, and near its opposite margin rests upon a roller 46 carried by a crank arm 47 of a shaft 48 carried by table 37. Said shaft is operable by a handle 49 and the latter is adapted to be secured at any desired adjustment by a latch mechanism 50 for engagement with sector 51. secured to table 37. The operation of lever 39 adjusts the table transversely to enable the operator to produce a double line of stitches in the cushion or article being operated upon. The lever 49 is for the purpose of tilting the container to change the angle of one line of stitches with respect to the other.

Figure 4:
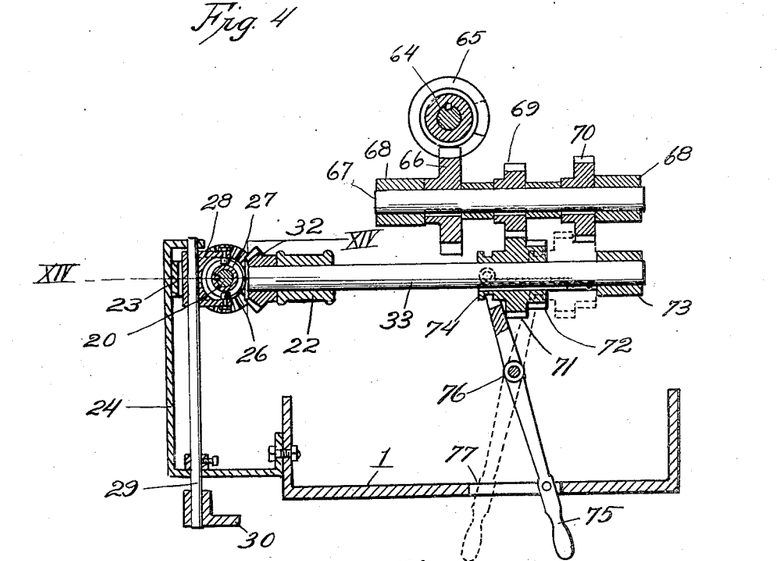
Figure 4 is a horizontal section taken on the line IV—IV of Figure 3.
Figure 5:
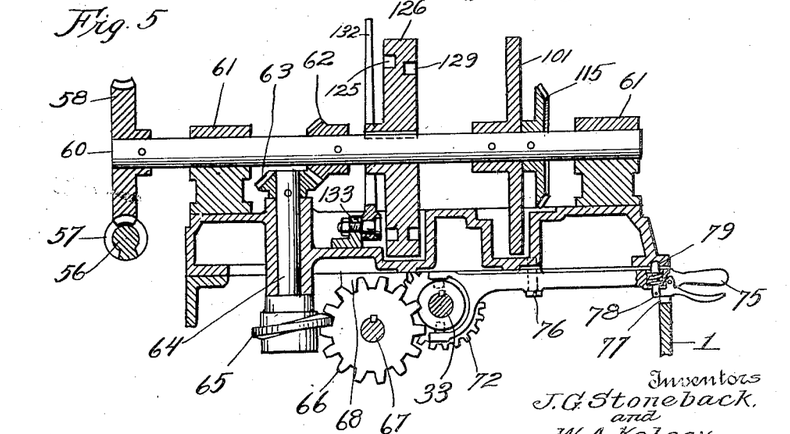
Figure 5 is a vertical section taken on the line V—V of Figure 2.
Figure 6:
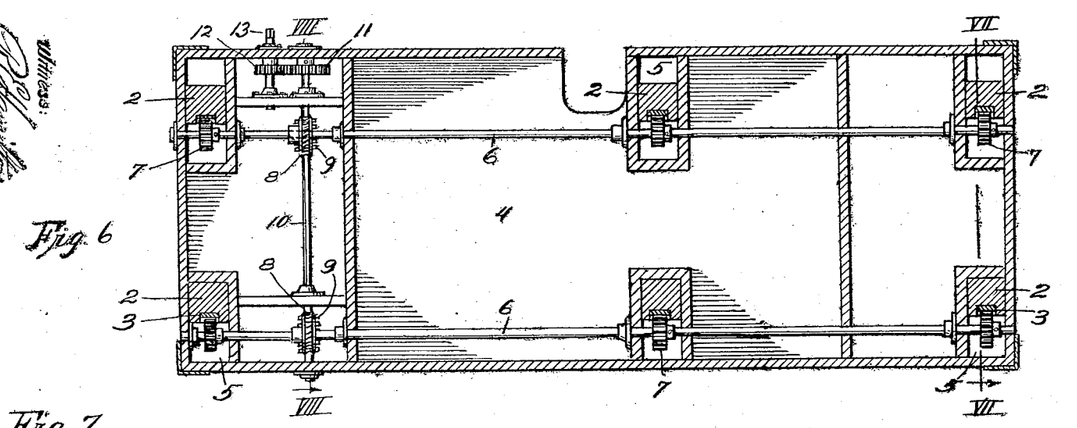
Figure 6 is a section taken in the plane of the dotted line VI—VI of Figure 2.
Figure 7:
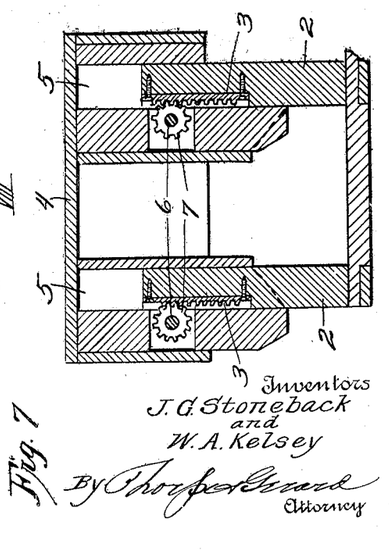
Figure 7 is a vertical section taken on the line VII—VII of Figure 6.
Figure 8:
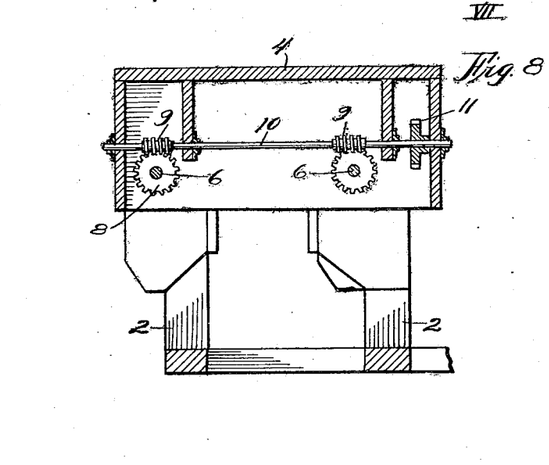
Figure 8 is a vertical section taken on the line VIII—VIII of Figure 6.
Figures 9, 10:
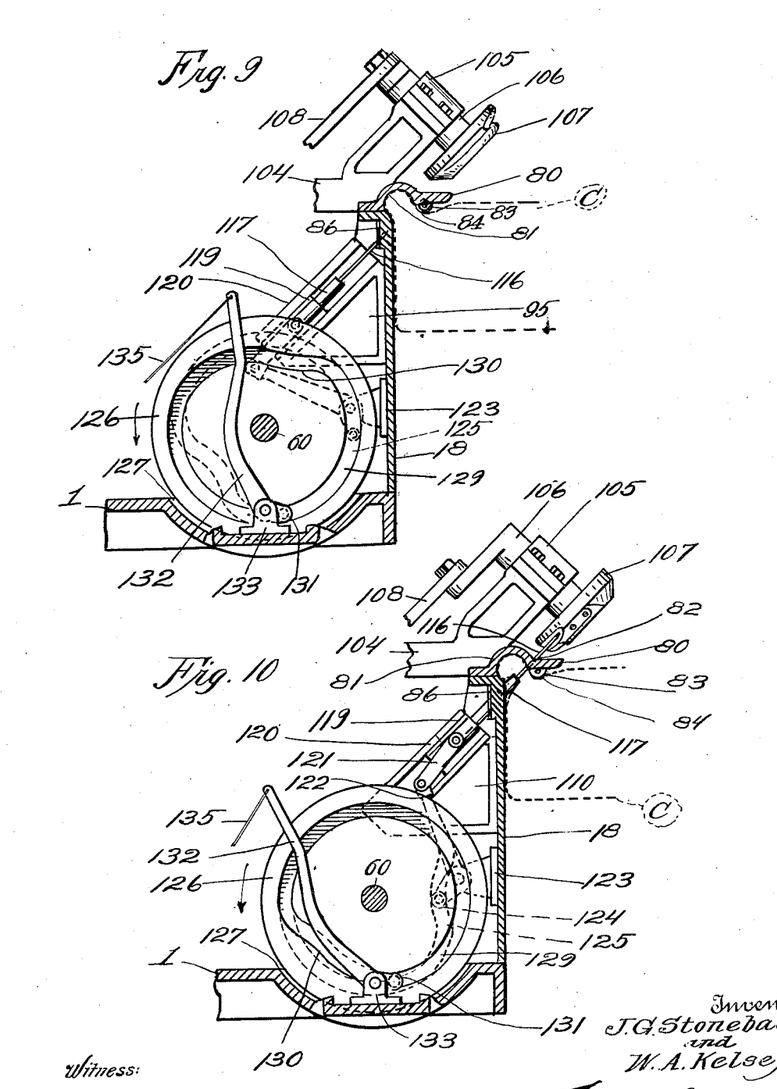
Figure 9 is a fragmentary vertical section taken on the line IX—IX of Figure 3.
Figure 10 is a similar section but with the operative parts in different positions.
Figures 13, 14, 15:
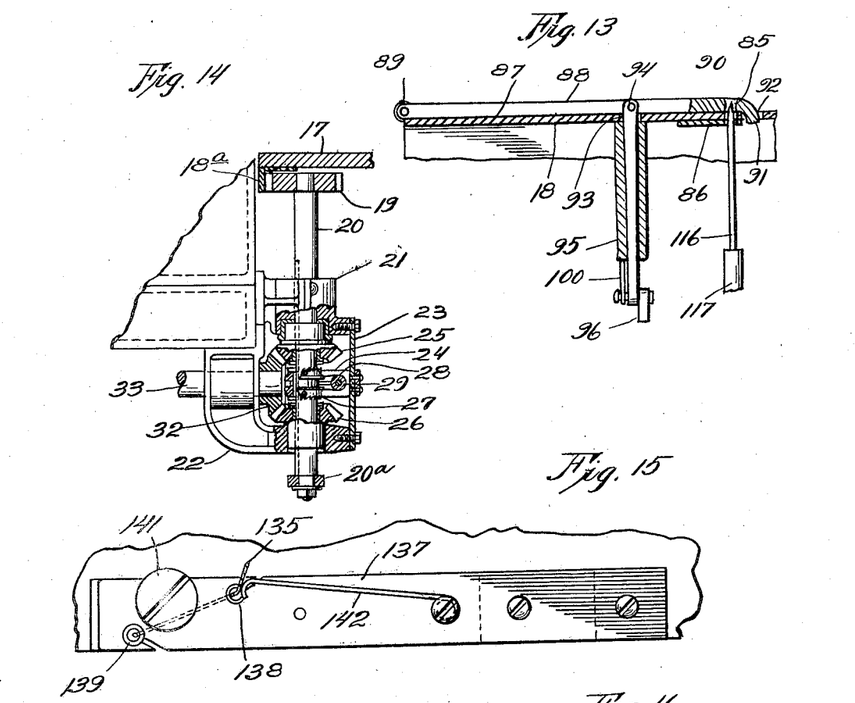
Figure 13 is a section taken on the line XIII—XIII of Figure 2, but on a magnified scale.
Figure 14 is a vertical section taken on the dotted line XIV—XIV of Figure 4.
Figure 15 is an enlarged plan view of the thread tension device.
Figure 16:
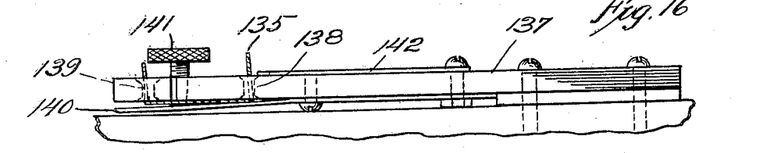
Figure 16 is an edge view of the construction shown by Figure 15.
Figure 17:
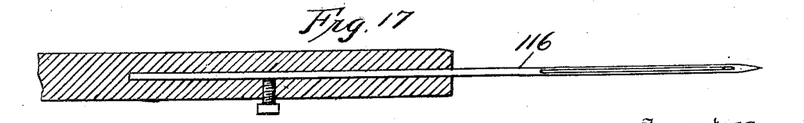
Figure 17 is a detail showing a needle fastened in the needle carrying arm.

Secured to the main frame of the machine at the right hand end thereof is a bracket 52 upon which is mounted an electric motor or the like 53. The shaft of the motor is connected by a flexible coupling 55 to a shaft 56 provided with a worm 57 engaging a worm wheel 58. The worm and worm wheel are preferably arranged within a suitable housing 59, and the worm wheel is mounted upon one end of a driving shaft 60 of the machine, said shaft being journaled in bearings 61 rigidly secured upon the main frame. A beveled gear 62 secured upon the driving shaft 60, meshes with a beveled gear 63 upon a vertical shaft 64 journaled in the main frame and provided at its lower end with a worm 65. The web of the worm 65 somewhat exceeds a complete convolution and the end portions of the web are at right angles to the axis of the worm shaft for a certain distance in order that the movement imparted by said worm to the worm wheel 66 shall be intermittent, said worm wheel being mounted upon a shaft 67 journaled in bearings 68 depending from the top of the table. The shaft 67 carries a pair of gear pinions 69 and 70 of different diameter (see Figure 4), suitably spaced apart and adapted for selective engagement by a slidable gear wheel comprising a member 71 and a member 72 of different diameters. Said double gear wheel is keyed to slide upon shaft 33 hereinbefore referred to, and one end of said shaft is journaled as explained, in bearing 22 (see Figure 14) and the other end in a bearing 73 depending from the top of the table. The double gear wheel is provided with a grooved hub 74 engaged by a forked lever 75 pivoted as at 76 to the table (see Figures 4 and 5), and projecting through a slot 77 in an end wall of the table. The lever is provided with a spring-actuated latch 78 for engagement with sockets 79 (one only appearing) in the table to lock the lever at the desired limits of its adjustment. It will be noted that pinion 69 is smaller than pinion 70, and is adapted to engage the larger member 71 of the double gear pinion, the pinion 70 being adapted to engage the member 72 of said double gear. When numbers 69 and 71 are engaged the intermittent movement of the reciprocatory table 17 will be shorter than when members 70 and 72 are engaged, and hence the stitches produced under the first-named condition will be shorter than under the last-named condition, as will be hereinafter explained more particularly.

The cushion C is mounted upon the container 44 and through the adjustment of table 37 held closely adjacent to the plate 18 upon the frame, and is also adapted through vertical adjustment of table 4, to be pressed upward against the overlying plate 80 bolted to the top of plate 18. The mechanism for effecting vertical adjustment of table 4 has been described, and in order that such adjustment shall not interfere with reciprocatory movement of table 17, the shaft 20 is adapted to slide through its bearings 21 and 22 so that gear pinion 19 shall remain in engagement with rack-bar 18ª. To accomplish this in the upward movement of the table a collar 20ª is secured to the lower end of shaft 20 and to an adjacent portion of one of the members forming a guide space 5 of table 4, so that it shall by engaging the lower side of bearing 22, limit the upward movement of the table, the latter in its downward movement obviously applying pressure which will effect downward movement of shaft 20, it being understood the latter is so keyed to the beveled gears 25 and 26, that it is always in condition to be rotated thereby.

The plate 80 is provided with a bowed portion 81 opposite the adjacent corner of the cushion for the reception of the roll edge formed thereon, as hereinafter explained. At the neck of the channel formed by said bowed portion, the plate 80 is provided with a needle passage 82 and adjacent the same with depending ears 83 between which is journaled a grooved sheave 84 for the guidance of the thread employed in producing the roll edges on the cushion, as hereinafter explained. Diagonally opposite the passage 82 at the opposite side of the neck formed conjointly by the said bowed portion of the plate and the adjacent portion of plate 18, a needle passage 85 is formed in said plate 18 and is continued through a needle plate 86 to said plate 18.

Plate 18 is provided with a horizontal groove 87 receiving a presser bar 88 pivoted at one end at 89 to the plate 18 and provided with a needle opening 90 registering with the passage 85. This presser-bar is adapted for applying pressure upon the corner of the cushion to produce a roll thereon to lie within the bowed portion of plate 80, and in order that the presser-bar shall not become entangled with the cushion or tear or injure the same, its free end is curved or bowed as at 91, and normally occupies an opening 92 formed in plate 18, as shown clearly by Figure 13.

At an intermediate point the plate 18 is provided with an opening 93 through which extends a bar 94 pivoted to the presser-bar 88, said bar 94 being guided in its movement by a bracket 95 secured to or formed with the plate 18 at the opposite side thereof from the cushion. The bar 94 is connected by a toggle 96 to a curved lever 97 fulcrumed at 98 on the said bracket, and provided at its opposite end with a roller 99 for engaging the periphery of a cam hereinafter mentioned. The application of force by the pressure-bar 88 against the cushion is effected through the instrumentality of a spring 100 mounted on the said bracket 95 and bearing at its opposite end against said bracket and the bar 94, the same force holding the roller 99 pressed against the cam 101 so that the cam face 102 thereof when opposite said roller 99, will receive the same and thus accommodate the thrust of the presser-bar. The cam rotates continuously in the direction indicated by the adjacent arrow, Figure 11, so that once in each revolution it permits the spring 100 to operate the presser-bar, and then overcomes the resistance of said spring and effects the withdrawal of said bar. With the parts proportioned as shown, the top of the main frame is provided with a depression 103 to accommodate the lower portion of the cam 101.

A bracket 104 mounted upon the plate 80 or cast therewith, is provided with a bearing 105 disposed at right angles to the alined passages 82, 85 and 90, and journaled in said bearing is a crank shaft 106 equipped at its lower end with a looper 107 for co-operation with a needle hereinafter described, for stitching the cushion in the formation of the roll edges thereon, and the crank of said shaft is connected pivotally to a rock lever 108 extending slidingly through a guide 109 pivoted at 110 to the said bracket 104. The opposite end of the rock lever is pivotally connected to a disk 111 secured upon the upper end of a short shaft 112 journaled in a bracket 113 bolted upon the main frame, and said shaft is provided at its lower end with a beveled gear 114 meshing with a large beveled gear 115 mounted upon the driving shaft 60.

The needle 116 is positioned to co-operate with the looper in the common and well-known manner, and reciprocates through the needle plate 86, plate 18, presser-bar 88, and the needle passage 82, and hence across the neck or mouth portion of the channel formed by the bowed plate 80. The holder 117 of the needle, extends through a guide bracket 118 mounted upon the main frame, and at an intermediate point is secured to a slide 119 mounted in a channelled guide 120 constituting a fixed part of bracket 95.

Figures 11, 12:
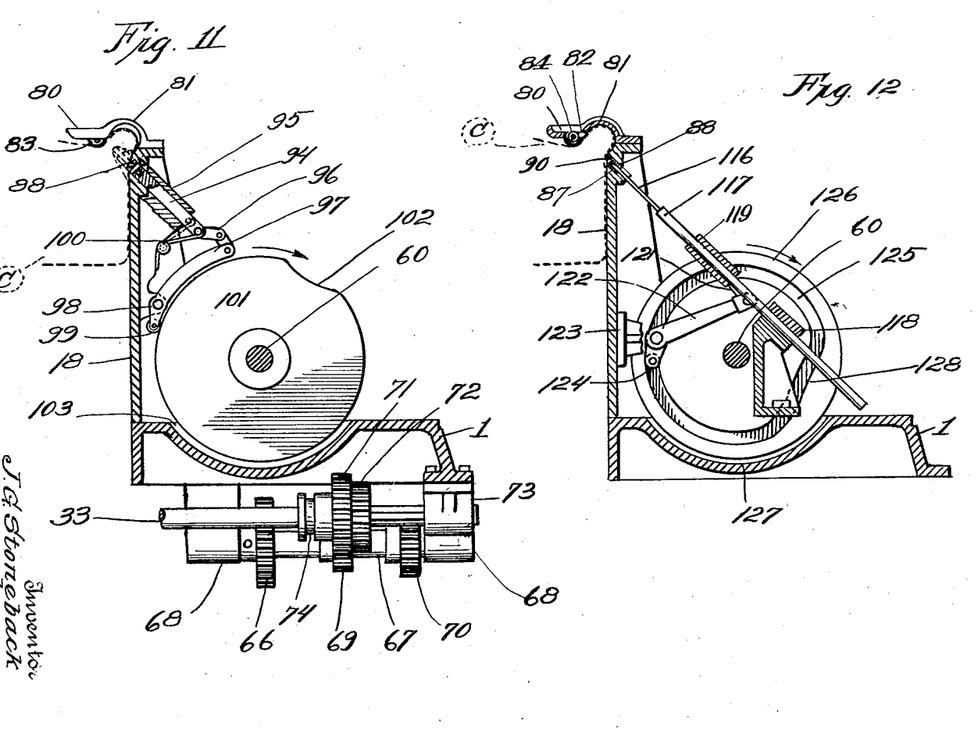
Fig. 11 is a vertical section taken on the line XI—XI of Figure 3.
Figure 12 is a vertical section taken on the line XII—XII of Figure 3.

The slide 119 is connected pivotally by link 121 with a bell-crank lever 122 mounted on a bracket 123 projecting from plate 18, and provided at its opposite end with a roller 124 engaging a groove 125 in a cam wheel 126 secured upon the driving shaft 60, the frame being provided with a depressed portion 127 for the accommodation of said cam wheel. The cam groove 125 comprises a major portion concentric with shaft 60 and a short cam portion 128, so that once in each revolution the engagement of the short or cam portion of the cam groove with the roller 124, will result in the forward thrust of the needle and its return to initial position, and in this connection it is desirable to state that the forward thrust of the needle and the power movement of the presser-bar occur simultaneously, but that the needle movement is of greater extent and continues after the presser-bar has been arrested by the cushion, it being also understood that the withdrawal movement of the needle continues likewise, so that when in its withdrawn position its pointed end shall lie within the passage 90 of the presser-foot, as shown by Figure 12.

The cam wheel 126 is provided in its opposite face with a cam groove comprising a major portion 129 concentric with the axis of shaft 60 and the substantially straight or cam portion 130, and said cam groove is engaged by a roller 131 mounted on a lever 132 fulcrumed on a bracket 133 secured on the main frame, the arrangement being such that said lever shall be rocked back and forth once in each revolution of the cam wheel for the purpose of alternately feeding the thread and relaxing the tension on the same, as will hereinafter appear.

Mounted upon the main frame is a spool holder 134 from the upper end of which the thread 135 leads to a guide bracket 136 mounted upon the frame.

From the bracket 136 the thread leads to a tension device 137, secured to the frame. Said device has a pair of eyes 138 and 139 and an underlying spring 140 to apply the requisite pressure against the thread between the said passages, this pressure being controlled by an adjusting screw 141. The eyes 138 and 139 open through the adjacent edges of the device 137 so that the thread may be threaded through said eyes by feeding it sidewise thereto, and to guard against the accidental dislocation of the thread where it passes through the eye 138, a spring retainer 142 is secured to the tension bar 137. From the eye 139 the thread leads to a guide 143 constituting an arm of a short shaft journaled in a bearing 144 secured to the frame, a torsion spring 145 imparting movement to the shaft to assist in holding the thread under tension. From the guide 143 the thread leads to a guide 146, and thence to and through the thread-tension lever 132, a second guide 147 and a third guide 148, and thence to the needle. The guides 146, 147 and 148, are formed upon a bar 149 secured to the main frame.

A rheostat 150, is suitably secured upon the base below the table 4, and 151 is a link pivotally connecting the rheostat mechanism with a control lever 152 fulcrumed upon the end of the frame, it being understood that the rheostat is in circuit with the motor 53 in the usual or conventional manner and therefore not illustrated.

Assuming that the parts are in the positions shown, the control lever 152 is manipulated to start the motor and effect operation of the drive shaft 60 and of the cam wheels 101 and 126 mounted thereon. The shaft, through the gear wheels 62 and 63 imparts rotation to the shaft 64 and hence to the worm 65. The worm imparts movement to the worm wheel 66 intermittently because of the dwell provided through the overlapping parallel ends of the worm, and shaft 67 transmits power through gear wheels 69 or 70 as the case may be, to the double gear wheel 71—72 and hence to the shaft 33. The proper manipulation of lever 30 effects rotation of shaft 20 in the proper direction to impart travel to the right to table 17, this movement being intermittent for the reason previously explained. At the end of each intermittent movements the presser-bar applies pressure on the cushion and forms a roll edge thereon and at the same time the needle passes through the neck of such roll in the manner herein explained and co-operates with the looper in producing a stitch, the needle withdrawing during the interims between such intermittent movements. When the table 17 has traveled a distance corresponding to the length of the cushion, the container 44 can be tilted upward and toward the plate 80 by means of the lever 49, and then the lever 30 can be manipulated to effect reverse travel of table 17, the second line of stitches thus produced being disposed at an angle to the first line of stitches. If desired the second line of stitching can be produced nearer the margin of the cushion and parallel with the first line of stitching by reversing the travel of the table as explained, without tilting the container. To accomplish this the table 17 must be adjusted the requisite distance toward the plate 18 through the instrumentality of lever 39, as hereinbefore explained. In the event cushions of different thickness are to be stitched, it will be apparent that the table 4 is vertically adjusted by the manipulation of the crank handle 14. After the roll has been completed at one edge of the cushion, the table is lowered to permit the cushion to be rearranged or reversed upon the container, and then the operations hereinbefore described are repeated, the reversal of position of the cushion being made four times if it is necessary to produce a roll edge at all four margins of the cushion. If the cushion is to be provided with a roll edge at the bottom as well as at the top, the cushion will of course be inverted and then the same process followed as described. It will be understood that the rotation of the cam 126 in each revolution thereof swings the lever 132 to withdraw thread from the holder and in the reverse direction to provide the necessary slack in the thread for the proper operation of the needle.

From the above description it will be apparent that we have produced a machine for sewing roll edges on upholstery which operates efficiently and expeditiously, and which obviously may be modified in various particulars without departing from the principle of construction and mode of operation involved or from the spirit and scope of the appended claims.

We claim:

1. In an upholstery sewing machine, a framework having an overhang portion, an intermittently movable table below the overhang portion, laterally tiltable means movable with the table for holding a cushion against the underside of the overhang portion, sewing mechanism for producing a longitudinal line of diagonal stitches through the corner of the cushion in contact with the said overhang portion, and means to clamp the cushion against said overhang portion timed to cooperate with said sewing mechanism.

2. In an upholstery sewing machine, a framework having an overhang portion, an intermittently movable table underlying the overhang portion, a transversely adjustable table on the first-named table, a container carried by said second table to support a cushion against the said overhang portion, and sewing mechanism to produce a longitudinal line of diagonal stitches through the corner of the cushion in contact with said overhang portion.

3. In an upholstery sewing machine, a framework having an overhang portion, an intermittently movable table underlying said overhang portion, a transversely-adjustable table on the first named table, a container carried by the said second table to support a cushion against the said overhang portion, means to tilt the container laterally, and sewing mechanism to produce a longitudinal line of stitches through the upper corner of the cushion at the depressed side thereof.

4. In an upholstery sewing machine, a framework having an overhang portion, a vertically adjustable table underlying the overhang portion, an intermittently movable table upon the vertically-adjustable table, laterally-adjustable cushion supporting means upon the intermittently-movable table, for holding a cushion against the underside of the said overhang portion, and sewing mechanism for producing a longitudinal line of diagonal stitches through the corner of the cushion in contact with the overhang portion.

5. In an upholstery sewing machine, a framework having an overhang portion, a vertically-adjustable table underlying the overhang portion, an intermittently-movable table on the vertically-adjustable table, a laterally-adjustable table on the intermittently-movable table, a tiltable container on the laterally-adjustable table for holding a cushion against the underside of the overhang portion, and means for producing a longitudinal line of diagonal stitches through the corner of the cushion in contact with said overhang portion.

6. In an upholstery sewing machine, a framework having an overhang portion provided with a longitudinally-extending channel in its underside, an intermittently-movable table for travel parallel with and below the channel, a transversely-adjustable means carried by said table, for holding a cushion against the underside of said overhang portion, a presser-bar for applying pressure diagonally against the cushion and toward said overhang portion in the interim between the intermittent movements of the table, and means for producing a longitudinal line of stitches diagonally across the cushion at the points thereof where compressed between the presser-bar and overhang portion.

7. In an upholstery sewing machine, a framework having an overhang portion provided with a longitudinally-extending channel in its underside, an intermittently-movable table for travel parallel with and below the channel, a transversely-adjustable means carried by said table, a laterally tiltable container on the transversely-adjustable means, for holding a cushion against the underside of said overhang portion, a presser-bar for applying pressure diagonally against the cushion toward said overhang portion in the interim between the intermittent movements of the table, and means for producing a longitudinal line of stitches diagonally across the cushion at the point thereof where compressed between the presser-bar and overhang portion.

8. In an upholstery sewing machine, a framework having an overhang portion provided with a longitudinally-extending channel in its underside, an intermittently-movable table for travel parallel with said channel, a cushion container above and movable with said table, means to tilt said container laterally with respect to said table, a presser bar extending longitudinally of the table at one side of the cushion on the container, means for causing said bar to apply pressure against the cushion to press the same against said overhang portion and into the said channel, and sewing mechanism to produce a longitudinal line of diagonal stitches through the cushion at the mouth of said channel.

9. In an upholstery sewing machine, a framework having an overhang portion formed with a longitudinal groove and provided with a second groove parallel with and slightly below the plane of the first groove, a presser-bar fitting in the second groove and pivoted to the framework and provided near its free ends with a passage; the said framework and overhang portion having passages alined with that of said presser-bar, means for intermittently feeding a cushion longitudinally of said grooves and against the underside of said overhang portion of the framework, yieldingly-actuated means for causing the free end of said presser-bar to press diagonally upward against said cushion to form a roll edge thereon within said first-named channel, and sewing means for producing a line of stitches through said cushion by reciprocating the needle element of said means, back and forth through the said alined passages and said cushion.

10. In an upholstery sewing machine, a framework having a vertical portion and an overhang portion projecting laterally therefrom and provided with an upwardly-bowed longitudinally extending portion, means for imparting intermittent longitudinal movement to a cushion and for holding the same pressed upwardly against said overhang portion, a presser-bar, yielding means for causing said presser-bar to press upwardly against said cushion to produce a roll thereon within the said bowed portion of the said overhang portion, and means for producing a longitudinal line of stitching through the cushion at the neck of said roll portion.

11. In an upholstery sewing machine, a framework having a vertical portion and an overhang portion projecting laterally therefrom and provided with an upwardly bowed longitudinally-extending portion, means for imparting intermittent longitudinal movement to the cushion and for holding the same pressed upwardly against said overhang portion, a presser-bar, yielding means for causing said presser-bar to press upwardly against said cushion to produce a roll thereon within the said bowed portion of the said overhang portion, a looper above the overhang portion, a threaded needle co-operating with the shuttle and a cam-actuated means for reciprocating the needle to produce a line of stitches through the said cushion at the neck of the roll thereon.

12. In an upholstery sewing machine, a framework having an overhang portion provided with a longitudinal channel in its underside, means for holding a cushion against said overhang portion, means for imparting intermittent movement to the last-named means, a presser-bar for pressing upwardly against the edge of said cushion to produce a roll thereon lying within said channel, and cam-actuated means to withdraw said presser-bar.

13. In an upholstery sewing machine, a framework having an overhang portion provided with a longitudinal channel in its underside, means for holding a cushion against said overhang portion, means for imparting intermittent movement to the last-named means, and a yieldingly-actuated presser-bar for pressing upwardly against the edge of said cushion to produce a roll thereon lying within said channel and cam actuated means to withdraw said presser-bar in the interim between intermittent movements of the cushion holding means.

14. In an upholstery sewing machine, a framework having an overhang portion, a table juxtaposed thereto, a second table upon the first one, means upon the second table for holding a cushion against the underside of said overhang portion, a rack and pinion for imparting movement to the second table, a vertical slidable shaft for the pinion, means for vertically adjusting the first table, and means whereby upward movement of said first table effects like movement of said shaft and pinion.

15. In an upholstery sewing machine, a framework having an overhang portion, a table juxtaposed thereto, a second table upon the first one, means upon the second table for holding a cushion against the underside of said overhang portion, a rack and pinion for imparting movement to the second table, a vertical slidable shaft for the pinion, means for vertically adjusting the first table, and means whereby upward movement of said first table effects like movement of said shaft and pinion; said second table overlying the shaft and pinion to impart downward movement thereto when the first-named table is lowered.

16. In an upholstery sewing machine, a framework having an overhang portion, a table juxtaposed thereto, a second table upon the first one, means upon the second table for holding a cushion against the underside of said overhang portion, a rack and pinion for imparting movement to the second table, a driven worm having its spiral thread terminating in ends disposed at right angles to the axis of the worm, a worm wheel enmeshed with the worm and turned intermittently thereby, and means for transmitting power from said worm wheel to said pinion.

17. In an upholstery sewing machine, a suitable framework, a driving shaft thereon, a second shaft, means for transmitting movement intermittently from the first-named shaft to said second shaft, gear pinions of different diameter secured on said second shaft, a third shaft, a slidable double gear keyed on the said third shaft and comprising members of different diameter for respective engagement with said pinions to vary the length of the intermittent movement transmitted therefrom, means for supporting a cushion in a horizontal position, means for transmitting power from said third shaft to said cushion-supporting means, sewing mechanism carried by the framework comprising a looper, a needle, and thread supplying and guiding means, a wheel mounted on the driving shaft and provided with a pair of cam grooves, means actuated by one of said grooves for alternately providing slack in the thread for the needle and for gathering an additional supply of thread, means actuated by the other cam groove for reciprocating the needle, and means actuated by the driving shaft for rotating the shuttle in co-operation with the needle.

In testimony whereof, we hereunto affix our signatures.

JOHN G. STONEBACK.
WILLARD A. KELSEY.